Sept. 18, 1928.  
A. LEVEDAHL  
1,684,633  
SCREW OR NUT DRIVING DEVICE FOR PORTABLE POWER DRIVEN ROTARY TOOLS  
Filed Sept. 23, 1927  2 Sheets-Sheet 1
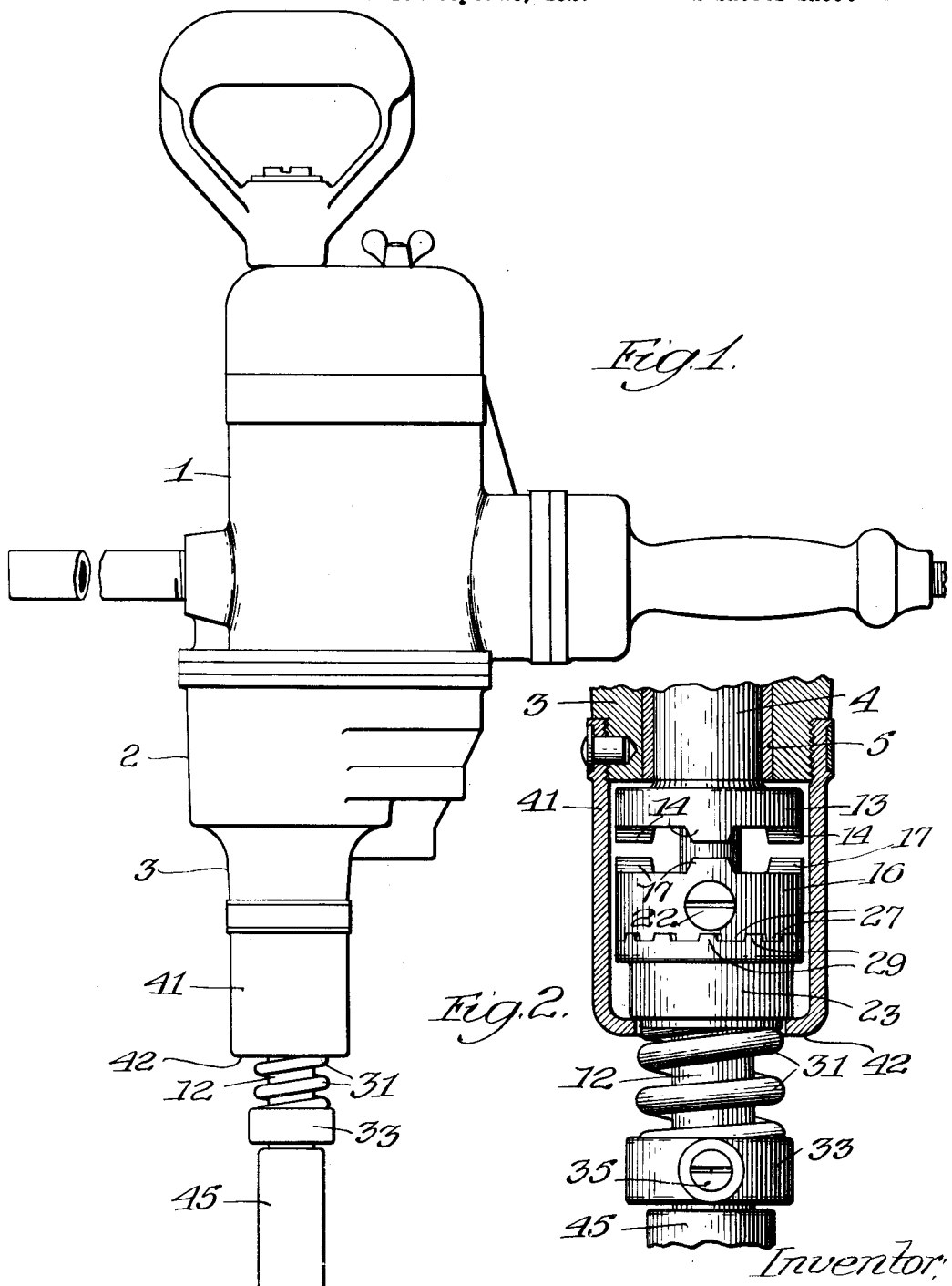

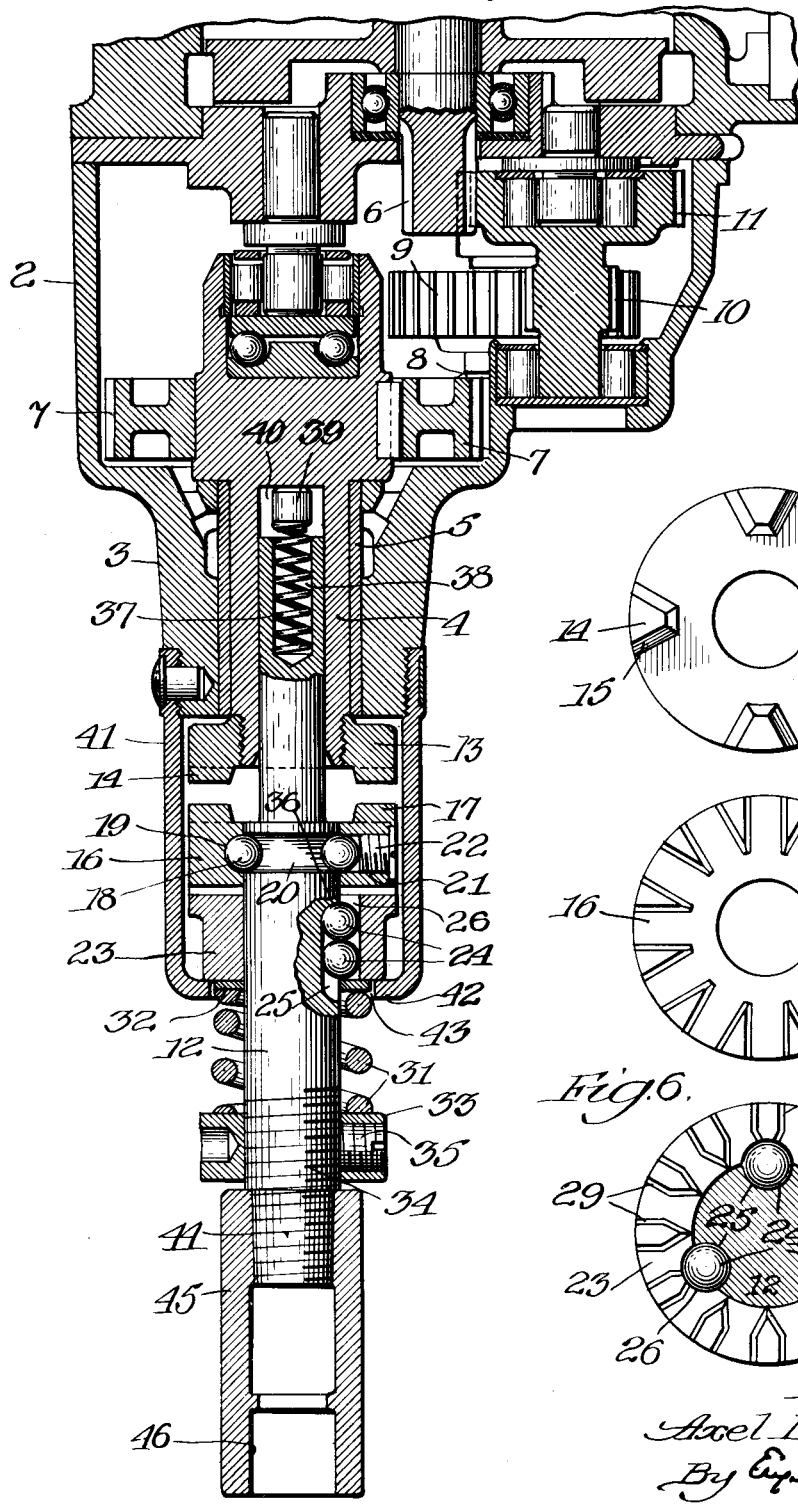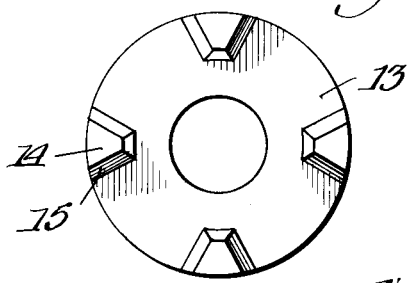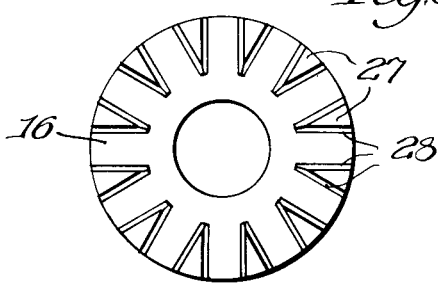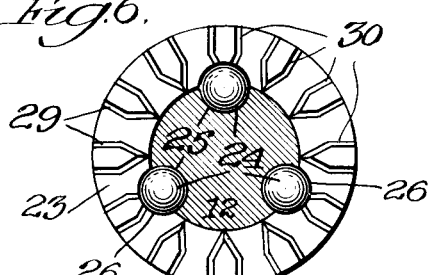

Patented Sept. 18, 1928.

1,684,633

UNITED STATES PATENT OFFICE.

AXEL LEVEDAHL, OF AURORA, ILLINOIS, ASSIGNOR TO INDEPENDENT PNEUMATIC TOOL COMPANY, OF CHICAGO, ILLINOIS, A CORPORATION OF DELAWARE.

SCREW OR NUT DRIVING DEVICE FOR PORTABLE POWER-DRIVEN ROTARY TOOLS.

Application filed September 23, 1927. Serial No. 221,602.

This invention relates to screw or nut driving devices or attachments for portable power driven rotary tools whereby screws or nuts may be rapidly and easily set by prower.

It has been the general practice heretofore to provide these devices or attachments with either a single clutch having solid clutch jaws or a combination of solid clutch jaws and disc frictions.

For setting large or heavy screws or nuts, large heavy tools are required in order to furnish the power necessary to do the work. In such tools the clutch jaws are large in proportion to the size and power of the tool and project outward to a considerable extent from the opposed faces of the separable clutch members on which the jaws are provided. The result is that, as the jaws pass over each other on slipping when the screw or nut becomes set, the whole tool is rapidly vibrated back and forth or up and down, depending on whether the tool is held in a horizontal or upright position. As this vibration, each time it occurs, is suddenly thrown against the body and arms of the operator holding the tool against the work, the operation of the tool becomes exceedingly burdensome and tiring, especially when setting a considerable number of screws or nuts in the course of a day's work. This has been one of the main objections to the use of the single clutch.

In the other type of clutch, namely, the one consisting of a combination of the solid jaws and disc frictions, the latter avoids the jumping over or ratcheting of the solid clutch jaws and thus eliminates the vibrations when a screw or nut becomes set, but there are two disadvantages to this second form of clutch. One is that the friction discs yield from the very beginning, that is, from the time the operator presses the tool against the work to engage the solid jaws and tighten up on the friction discs. With the latter yielding, a screw or nut is not set as tight with the same applied power as with the single type of clutch. Second, as the friction clutch must be held tightly engaged by the pressure of the operator forcing the tool against the work, said clutch does not release as soon as a screw or nut becomes set or tight, with the result that the total torque of the motor of the tool is thrown on the hands and arms of the operator at that time. This is considerable in the large heavy tools because the motors are large and heavy and operating at high speed have considerable momentum when in operation. In these tools this force is so strong that it tends to turn the entire tool out of the grasp of the operator. Being required to resist this force each time a screw or nut is set, places the operator under considerable strain which, in addition to holding the tool itself, is exceedingly burdensome and tiring. Moreover, with the friction clutch the moment of slippage allowed by the clutch varies in accordance with the wear on the clutch discs and the pressure at which the operator holds the tool against the work. As the day's work progresses, this pressure naturally decreases in proportion to the tire of the operator. This prevents giving all screws or nuts a uniform tightness, with the result that it is often necessary to go over the screws and nuts and tighten them by hand even after they have been set by power.

The object of my invention is to provide a clutch mechanism which will overcome the objections referred to and permit the setting or tightening of screws or nuts uniformly and without any strain or burnden on the operator as heretofore.

The clutch mechanism contemplated by my invention consists of a main clutch and a supplemental clutch, both having separable clutch members with co-operating inclined solid clutch teeth, all of which in the respective clutches are engaged when setting a screw or nut and thus provide a metal to metal contact through the entire clutch mechanism which will use the full momentum and torque of the motor of the tool for setting without yielding as with the friction discs. The full effect of the driving force of the motor is retained through the clutches until the screw or nut becomes set, as the supplemental clutch does not release until the work is done. When the clutch members of the supplemental clutch come apart, the pull or torque on the screw or nut does not continue, as with the friction clutch, but is entirely released. If the operator withdraws the tool at this point he has no torque to contend with. If he still presses the tool against the work the main clutch remains engaged, but the supplemental clutch simply releases and after moving one tooth again engages for an instant and again releases, this continuing as the teeth pass or ratchet over each other (the momentum helping) without imparting any tiring or burdensome torque or momentum strains on the operator as heretofore. The teeth of the supplemental clutch have a slight clearance between them so that on engaging in the manner just referred to they will impart a number of repeated hammer-like blows on the shaft of the device in its direction of rotation for giving a final tightening to the screws or nuts being set. The teeth of the supplemental clutch in ratcheting will also give audible indication to the operator that the screw or nut has become set and thus advise the operator the instant the tool should be withdrawn from the work. A spring tension is provided for the supplemental clutch so that the torque at which the supplemental clutch releases may be regulated or controlled. The teeth of the supplemental clutch are inclined at an angle greater than those of the main clutch so that the supplemental clutch will release before the main clutch and thus avoid any possibility of the tool being jarred or vibrated back and forth, as with the single clutch as heretofore.

The invention consists further in the matters hereinafter described and claimed.

In the accompanying drawings—

Fig. 1 shows a portable power driven tool equipped with the device of my invention;

Fig. 2 has the guard or sleeve for the clutches in vertical section to show the clutch members;

Fig. 3 is an enlarged vertical sectional view through the device and the associated spindle part of the tool; and Figs. 4, 5, and 6 are face views showing the clutch teeth of the clutch members of the respective main and supplemental clutches.

In the drawings, I have shown the device or attachment of my invention applied to a portable electric drill, which has connected motor and gear cases 1 and 2, with a tubular extension 3 on the forward side of the gear case and in which extension is journaled the rotary spindle 4 of the tool with a bearing bushing 5 about the spindle in said extension, as shown in Fig. 3. The spindle 4 is driven from the armature shaft 6 of the motor of the tool through a speed reducing gearing which is located in the case 2 and comprises a gear 7 fixed on the upper end of the spindle 4 and meshing with a pinion 8 carried by a gear 9. The latter meshes with a pinion 10 carried by a gear 11 which meshes with gear teeth on the armature shaft 6 where it extends into the case 2.

The device or attachment of my invention comprises a shaft 12 which has its inner end extending into and slidably and rotatably mounted in the spindle 4, the latter being made hollow for the purpose. The outer end of the spindle 4 extends beyond the extension 3 and is there provided with an annular clutch member 13, which has on its outer face a plurality of jaws or clutch teeth 14 having inclined side faces 15, as shown in Fig. 4. The clutch member 13 is screwed or keyed on the outer end of the spindle 4 and turns with the spindle when the latter is rotated by the armature shaft 6 of the motor during the operation of the tool.

A similar clutch member 16 is located on the shaft 12 just beyond the clutch member 13, and has on its inner face a plurality of jaws or clutch teeth 17 made and arranged similar to the clutch teeth 14 and adapted to engage the same on pressing the tool against the work. The clutch member 16 is connected with the shaft 12 by means of a number of balls 18, 18 fitting half in each of circumferential grooves 19, 20 in the clutch member 16 and shaft 12, respectively, as shown in Fig. 3. The balls 18 allow the clutch member 16, when free, to turn easily on the shaft 12 with practically no friction, and in conjunction with the grooves 19, 20 hold said clutch member fixed in relation to its position on said shaft. In assembling the parts, the balls 18 are inserted in the grooves 19, 20 through a hole 21 in the clutch member 16 after the latter has been brought to its proper position on the shaft. The hole 21 is threaded so as to be closed by a screw plug 22 after the balls are in the grooves.

A third annular clutch member 23 is slidably mounted (within limits) on the shaft 12 beyond the clutch member 16. This slidable connection is made through the provision of three sets of ball keys 24, 24 located half in each of longitudinal grooves 25, 26 in the clutch member 23 and shaft 12, respectively, as shown. Each set of keys preferably comprises a pair of balls 24, and the three sets of balls and their grooves are spaced apart circumferentially about the shaft 12 and the clutch member 23, as shown in Fig. 6.

The outer face of the clutch member 16 is provided with a multiplicity of clutch teeth 27 arranged about the clutch member and having inclined side faces 28, 28, as shown in Fig. 5. The inner face of the clutch member 23 is provided with a similar number of clutch teeth 29 which have inclined side faces 30, as shown in Fig. 6. The clutch teeth 29 are arranged so as to fit within the spaces between the clutch teeth 27, and with the side faces of these teeth inclined they may slip and ratchet over each other when one clutch member is turned with respect to the other in the manner to be presently described.

A relatively heavy coiled spring 31 surrounds the shaft 12 beyond the clutch member 23. This spring has its inner end against a washer 32 at the outer end of the clutch member 23, and has its outer end bearing against a nut 33 screwed on the threaded portion 34 of the shaft 12. By this construction, the nut 33 may be adjusted along the shaft 12 to regulate the tension of the spring 31 and thus set the torque at which the teeth of the cluch members 16 and 23 may slip with respect to each other on the setting of a nut or screw during the operation of the tool. The nut 33 is fixed in its adjusted positions along the shaft by a set screw 35 carried by the nut. The washer 32 serves to close the outer ends of the grooves 26 so that the balls 24 can not work or drop out of the same. These balls are prevented from working or dropping out of the opposite ends of the grooves by shoulders 36 at such ends of the grooves 25.

The clutch members 13 and 16 are normally held disengaged or in separated relation by a coiled spring 37 fitted in a bore 38 at the inner end of the shaft 12. The inner end of this spring carries a plug 39, which is forced by the spring against the inner end 40 of the hollow in the spindle 4. The spring 37 urges the shaft 12 outward from the spindle 4 and thus normally maintains the clutch members 13 and 16 disengaged or apart, while the spring 31 normally holds the clutch member 23 engaged with the one 16.

A sleeve 41 is attached to the outer end of the extension 3 and projects beyond the same and forms a protecting housing or guard about all of the clutch members of the device. The lower end of the sleeve 41 is turned inward to provide a circular flange 42 which projects over the outer clutch member 23 and limits the outward movement of the shaft 12 by the spring 37 and also prevents said shaft from working or dropping out of the spindle 4. The opening 43 in the flange 42 is large enough in diameter to receive the washer 32 and thus permits the spring 31 to yieldably hold the clutch member 23 engaged with the clutch member 16 even when the shaft 12 is moved inward by the pressure of the tool on the work to engage the clutch members 13 and 16.

The outer end of the shaft 12 is reduced, as at 44, to receive a socket 45, the lower end of which is suitably shaped at 46 to fit the particular shape and size of nuts for which the socket is designed. The socket 45 may have either a screw threaded or a keyed connection with the shaft 12, the keyed connection being used with a reversible tool, whereby the socket may be used for setting as well as taking off nuts. For the different sizes and shapes of nuts, sockets such as 45 with appropriately shaped outer ends will be attached to the shaft 12. For setting screws, a tool holder carrying a driving bit will be attached to the outer end of the shaft 12 in place of a socket 45 as now shown.

The device shown and described operates as follows: The operator holds the tool by the handles provided on the outside of the tool casing, and sets the motor of the tool in operation by turning on the power thereto through the switch which is usually provided in or adjacent to one of the handles of the tool. With the spring 37 maintaining the clutch members 13, 16 apart and forcing the clutch member 23 against the flange 42, the friction afforded between these engaging parts will be sufficient to prevent the shaft 12 from being turned by the rapidly rotating spindle 4, thereby allowing the operator to place the socket 45 (which at this time is not rotating) over the nut to be set. The operator then pushes the entire tool bodily against the nut, which results in moving the outer end of the guard 41 forward of and out of contact with the clutch member 23 and also in moving the rotating clutch member 13 into engagement with the one 16. The shaft 12 will be turned to set the nut as soon as the teeth 14, 17 of the clutch members 13, 16 take hold. The spacing between these teeth on their respective clutch members is wide enough so that plenty of time is allowed to bring the clutch members together before the teeth take hold. This is especially important in connection with the large heavy tools used for the larger sizes of screws and nuts, as the movement to bring the clutch members together is slower, which makes it necessary for the spaces between the clutch teeth to be wide enough for the teeth to completely enter before the teeth take hold. With the clutch member 16 held from rotation on the shaft 12 by the clutch member 23, the shaft will be rotated by the spindle 4 to set the nut as soon as the teeth 14, 17 take hold. As soon as the nut becomes initially set, the tightened nut tends to resist the further turning of the shaft 12 by the spindle 4, whereupon the teeth 27 on the outer face of the clutch member 16, which continues to be rotated by the spindle, act on the teeth of the clutch member 23 to force it away from the clutch member 16 against the spring 31, thereby permitting the teeth 27 to pass by and ratchet over the ones 29. This follows because the teeth 27, 29 are cut at sharper angles than the teeth 14, 17 and thus slip at a torque less than what it would require to cause the slippage or disengagement of the teeth 14, 17. This releases the shaft 12 from the full effect of the driving torque of the rotating spindle 4. With the clutch member 23 urged inward by the spring 31, the teeth 27, 29 repeatedly engage as they ratchet over each other, and a succession of hammer-like blows are imparted to the shaft 12 in its direction of rotation to further turn it to effect a final tightening of the nut. The spacing between the teeth 27 is slightly wider than the width of the teeth 29, so that there is a slight clearance beween them when they are engaged, as shown in Fig. 2. This will allow the teeth 29 to enter these spaces as the teeth ratchet and thus impart the hammer blows mentioned. This is one of the important features of my invention, because all the nuts set by the tool will have a substantially uniform tightness and thus avoid the necessity and expense of going over the nuts with a hand wrench to check them.

The clutch member 13 and the co-operating part of the clutch member 16 constitute the main clutch, while the clutch member 23 and the co-operating part of the member 16 constitute the supplemental clutch. With the supplemental clutch releasing the shaft 12 from the spindle 4 as soon as the nut becomes set and without requiring that the main clutch be disengaged, practically no torque strains will be thrown on the hands or arms of the operator holding the tool even though the operator does not withdraw the tool from the nut the instant it becomes set. This is another important advantage of my invention because the operator is relieved of this torque and may rapidly and easily set many large nuts in the course of a day's work without undue strain or effort. The clicking noise produced by the ratcheting teeth 27, 29 of the supplemental clutch will give audible signal to the operator that the nut has been set, and thus notify him when to withdraw the tool from the work and separate the main clutch. With the motor still running, the operator applies the tool to the next nut and the operations above are repeated.

With the clutch member 23 out of engagement with the outer end of the guard 41 during the nut or screw setting operations, the clutch member 23 may yield against its spring 31 to release the clutch members 16, 23 without the guard interfering with the action. Moreover, with the teeth 27, 29 relatively small or shallow, they may ratchet over each other without giving much axial movement to the body of the tool. Thus the backward and forward movement of the tool in the direction of its axis as the teeth pass rapidly over each other during their ratcheting action is not felt by the operator, as would be should the teeth be made larger or as large as the ones 14, 17 of the main clutch. With the shaft 12 held against positive rotation by the friction between the clutch member 23 and flange 42 when the clutch members 13, 16 are disengaged or apart, the tool may be forced against the work without the socket or bit on the shaft rotating to mar the work. Moreover, the operator may freely turn the shaft 12 by hand so as to position the socket or bit to properly engage the nut or screw.

The device or attachment of my invention is simple in construction and reliable in operation. With the torque strains and body jars eliminated, the tool may be operated without undue burden and thus the productiveness of the operator greatly increased. The only tire on the operator will be from the weight of the tool, and that is negligible as compared to the torque strains and body jars referred to. The balls 18 and 24 for rotatably and slidably connecting the clutch members 16 and 23 to the shaft 12 reduce friction and thus make the device easy to operate.

The details of structure shown and described may be variously changed and modified without departing from the spirit and scope of my invention.

I claim as my invention:

1. In a portable power driven rotary tool, the combination with the tool spindle, of a screw or nut driving device comprising a shaft rotatably supported by said spindle, main and supplemental clutches for said shaft and spindle, said clutches consisting of separable clutch members having co-operating clutch teeth, and means permitting the teeth of the supplemental clutch to slip to release the shaft from the spindle as soon as the screw or nut becomes set.

2. In a portable power driven rotary tool, the combination with the tool spindle, of a screw or nut driving device comprising a shaft rotatably supported by said spindle, main and supplemental clutches for said shaft and spindle, said clutches consisting of separable clutch members having co-operating clutch teeth, and means permitting the teeth of the supplemental clutch members to slip to release the shaft from the spindle as soon as the screw or nut becomes set, the teeth of the supplemental clutch members on slipping imparting a succession of rapid hammer-like blows on the shaft in the direction of its rotation to give final tightening to the screw or nut.

3. In a portable power driven rotary tool, the combination with the tool spindle, of a screw or nut driving device comprising a shaft rotatably supported by said spindle, main and supplemental clutches for said shaft and spindle, said clutches consisting of separable clutch members having co-operating clutch teeth, and means permitting the teeth of the supplemental clutch members to slip to release the shaft from the spindle as soon as the screw or nut becomes set, the teeth of the supplemental clutch members on slipping producing a clicking sound to give audible indication of the setting of the screw or nut.

4. In a portable power driven rotary tool, the combination with the tool spindle, of a screw or nut driving device comprising a shaft rotatably supported by said spindle, main and supplemental clutches for said shaft and spindle, said clutches consisting of separable clutch members having co-operating clutch teeth, and means permitting the teeth of the supplemental clutch to slip at a predetermined torque to release the shaft from the spindle without throwing the torque of the rotating spindle on the operator holding the tool.

5. In a portable power driven rotary tool, the combination with the spindle of the tool, of a screw or nut driving device comprising a shaft rotatably supported by said spindle, main and supplemental clutches for said shaft and spindle, said clutches consisting of separable clutch members having co-operating inclined clutch teeth, the teeth of the supplemental clutch members being at a sharper angle than those of the main clutch members so as to slip at a predetermined torque while the teeth of the main clutch members remain engaged.

6. In a portable power driven rotary tool, the combination with the tool spindle, of a screw or nut driving device comprising a shaft rotatably supported by the spindle, clutch means between said shaft and spindle, and means included in the clutch means whereby the clutch means will retain the full effect of the torque and momentum of the motor of the tool on the shaft until the screw or nut has become set.

7. In a portable power driven rotary tool, the combination with the tool spindle, of a screw or nut driving device comprising a shaft rotatably supported by said spindle, main and supplemental clutches for said shaft and spindle, said clutches consisting of separable clutch members having co-operating clutch teeth, and means permitting the teeth of the supplemental clutch members to slip to release the shaft from the spindle at a predetermined torque without the necessity of the clutch members of the main clutch being separated or their teeth becoming disengaged, one of the members of the supplemental clutch moving outward from the main clutch on releasing.

8. In a portable power driven rotary tool, the combination with the tool spindle, of a screw or nut driving device comprising a shaft having its inner end slidably and rotatably mounted in said spindle, three axially aligned clutch members having co-operating clutch teeth on their opposed faces, said clutch members being arranged with the shaft extending through them and with the inner clutch member fixed to the spindle and the intermediate and outer clutch members rotatably and slidably mounted, respectively, on said shaft, spring means urging the shaft outward from the spindle for normally holding the intermediate clutch member disengaged from the inner one, and a spring yieldably holding the outer clutch member in engagement with the intermediate one.

9. In a portable power driven rotary tool, the combination with the tool spindle, of a screw or nut driving device comprising a shaft having its inner end slidably and rotatably mounted in said spindle, three axially aligned clutch members having co-operating clutch teeth on their opposed faces, said clutch members being arranged with the shaft extending through them and with the inner clutch member fixed to the spindle and the intermediate and outer clutch members rotatably and slidably mounted, respectively, on said shaft, spring means urging the shaft outward from the spindle for normally holding the intermediate clutch member disengaged from the inner one, a spring for yieldably holding the outer clutch member engaged with the intermediate one, and means for preventing the shaft from working or dropping out of the spindle.

10. In a portable power driven rotary tool, the combination with the tool spindle, of a screw or nut driving device comprising a shaft having its inner end slidably and rotatably mounted in said spindle, three axially aligned clutch members having co-operating clutch teeth on their opposed surfaces, said clutch members being arranged with the shaft extending through them and with the inner clutch member fixed to the spindle and the intermediate and outer clutch members rotatably and slidably mounted, respectively, on said shaft, spring means urging the shaft outward from the spindle for normally holding the intermediate clutch member disengaged from the inner one, a spring for yieldably holding the outer clutch member engaged with the intermediate one, and means on the shaft for adjusting the tension of said spring.

11. In a portable power driven rotary tool, the combination with the tool spindle, of a screw or nut driving device comprising a shaft having its inner end slidably and rotatably mounted in said spindle, three axially aligned clutch members having co-operating inclined clutch teeth on their opposed faces, said clutch members being arranged with the shaft extending through them and with the inner clutch member fixed to the spindle and the intermediate and outer clutch members rotatably and slidably mounted, respectively, on said shaft, a spring yieldably holding the outer clutch member engaged with the intermediate one, spring means urging the shaft outward from the spindle for normally holding the intermediate clutch member disengaged from the inner one, and a sleeve secured to the casing of the tool at the spindle and housing all of said clutch members, said casing having a shoulder against which the outer clutch member is normally held by said spring means.

12. In a portable power driven rotary tool, the combination with the tool spindle, of a screw or nut driving shaft associated with said spindle, main and supplemental clutches for said spindle and shaft, said clutches consisting of separable clutch members having co-operating clutch teeth, and means permitting the supplemental clutch to slip at a predetermined torque to release the shaft from the spindle without the necessity of the clutch members of the main clutch being separated or their teeth becoming disengaged.

13. In a portable power driven rotary tool, the combination with the tool spindle, of a screw or nut driving device comprising a shaft having its inner end slidably and rotatably mounted in said spindle, three axially aligned clutch members having co-operating clutch teeth on their opposed faces, said clutch members being arranged with the shaft extending through them and with one clutch member fixed to the spindle, means including balls for rotatably and slidably connecting, respectively, the other two clutch members to said shaft, spring means urging the shaft outward from the spindle for normally holding the rotatably mounted clutch member disengaged from the one on the spindle, and a spring for yieldably holding the slidably mounted clutch member in engagement with the rotatably mounted one.

In testimony whereof I affix my signature

AXEL LEVEDAHL.